(12) United States Patent
Tennakoon

(10) Patent No.: US 12,015,582 B1
(45) Date of Patent: Jun. 18, 2024

(54) SOCIAL NETWORKING SYSTEM AND METHOD

(71) Applicant: Aim Chat Inc., Riverside, CA (US)

(72) Inventor: Chamli Tennakoon, Riverside, CA (US)

(73) Assignee: AIM CHAT INC., Riverside, CA (US)

( * ) Notice: Subject to any disclaimer, the term of this patent is extended or adjusted under 35 U.S.C. 154(b) by 0 days.

(21) Appl. No.: 18/446,840

(22) Filed: Aug. 9, 2023

(51) Int. Cl.
| | |
|---|---|
| G06F 15/16 | (2006.01) |
| G06Q 50/00 | (2012.01) |
| H04L 51/04 | (2022.01) |
| H04W 4/02 | (2018.01) |
| H04W 4/029 | (2018.01) |

(52) U.S. Cl.
CPC ............ *H04L 51/04* (2013.01); *G06Q 50/01* (2013.01); *H04W 4/026* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 2013/0226453 | A1* | 8/2013 | Trussel | H04L 51/224 709/206 |
| 2013/0290909 | A1* | 10/2013 | Gray | G01C 21/3629 715/854 |
| 2014/0122136 | A1* | 5/2014 | Jayanthi | G06Q 50/01 705/5 |
| 2016/0314132 | A1* | 10/2016 | Lineberger | H04L 67/306 |
| 2021/0042724 | A1* | 2/2021 | Rathod | G07G 1/0054 |

\* cited by examiner

*Primary Examiner* — Wing F Chan
*Assistant Examiner* — Andrew Woo
(74) *Attorney, Agent, or Firm* — Eric Karich; Karich & Associates

(57) ABSTRACT

A social networking system has one or more computer devices with a computer processor and computer memory, the computer memory storing executable code that, when executed by the computer processor, enables the computer system to perform the following method: receiving profile information for each of a plurality of users; storing the profile information in a database; tracking a location of each of the plurality of users; displaying on a map the location of a current user, and also displaying other users who are physically located proximate the current user; displaying an indication of the direction of vision of the current user responsive to the physical movements of the computer device of the user; in response to the current user directing his or her direction of vision at one of the other users, marking that user as a target user and displaying the profile of the target user; and sending a chat request from the current user to the target user.

6 Claims, 5 Drawing Sheets

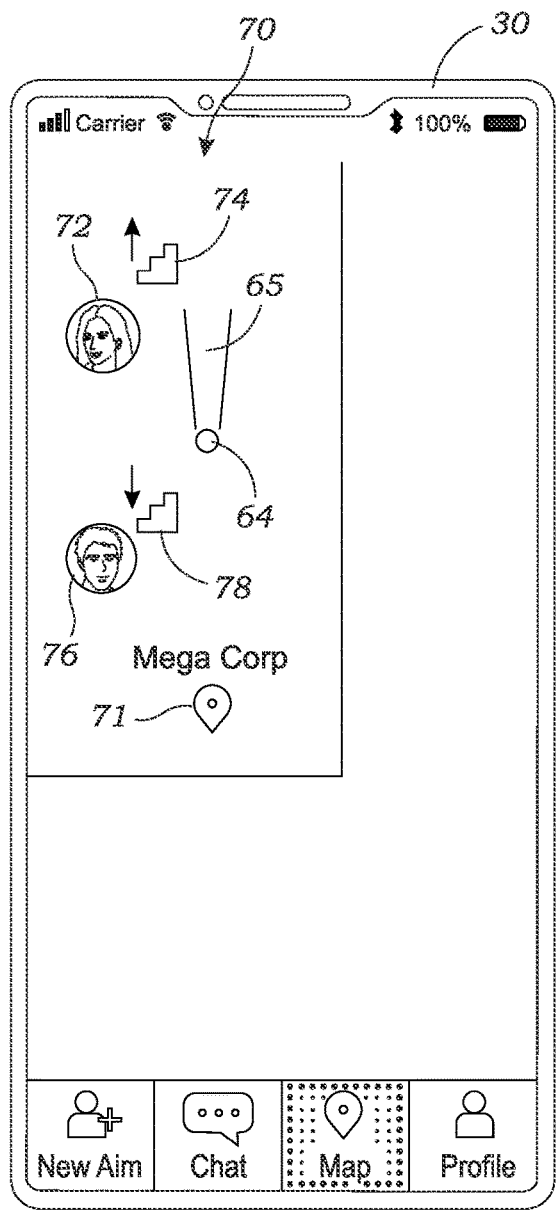
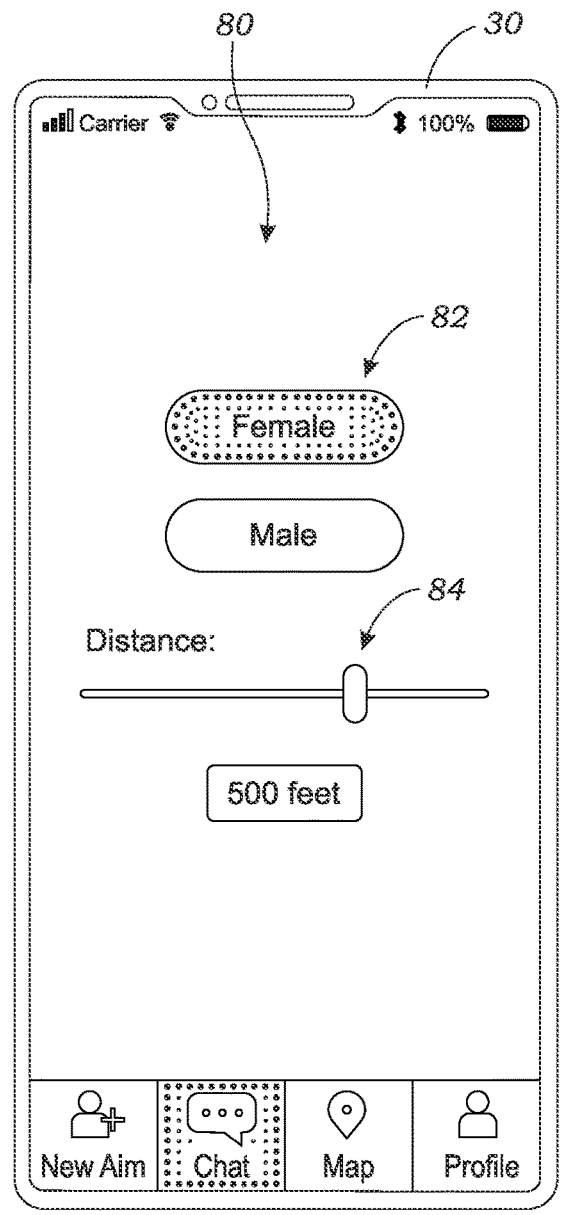
FIG. 4
FIG. 5

SOCIAL NETWORKING SYSTEM AND METHOD

BACKGROUND OF THE INVENTION

Field of the Invention

This invention relates generally to social networking systems, and more particularly to a social networking system implemented on a smartphone for enabling users to initiate communications with a person that is physically proximate to them.

Description of Related Art

Computer-based social networks have been established since the earliest days of the Internet. User profiles became a central feature of social networking sites, allowing users to compile lists of friends and search for other users with similar interests. New social networking methods were developed over time, and many sites began to develop more advanced features for users to find and manage friends. Facebook, which launched in 2004, quickly became the largest social networking site in the world in 2009. Web-based social networking services make it possible to connect people who share interests and activities across political, economic, and geographic borders. Online communities based upon e-mail and instant messaging were also created.

Dating sites have also been established that enable users to browse pictures and profiles to attempt to make connections for purposes of communicating with potential dating partners. These sites typically rely on people connecting via the user profiles, and don't typically take into account the physical locations of the users at a given time, outside of being in general proximity to each other (e.g., within 50 miles, in the same city, etc.).

There is a need in the art for a social networking system that enables users to attempt to establish communication with other users that are physically proximate to each other, to assist in establishing real world communications between the parties. The prior art does not teach a system that enables such a connection between users who are physically located proximate each other. The present invention fulfills these needs and provides further advantages as described in the following summary.

SUMMARY OF THE INVENTION

The present invention teaches certain benefits in construction and use which give rise to the objectives described below.

The present invention provides a social networking system that utilizes one or more computer devices having a computer processor and computer memory, the computer memory storing executable code that, when executed by the computer processor, enables the computer system to perform the following method: receiving profile information for each of a plurality of users; storing the profile information in a database; tracking a location of each of the plurality of users; displaying on a map the location of a current user, and also displaying other users who are physically located proximate the current user; displaying an indication of the direction of vision of the current user responsive to the physical movements of the computer device of the user; in response to the current user directing his or her direction of vision at one of the other users, marking that user as a target user and displaying the profile of the target user; and sending a chat request from the current user to the target user.

A primary objective of the present invention is to provide a social networking system having advantages not taught by the prior art.

Another objective is to provide a social networking system that enables users to attempt to establish communication with other users who are physically proximate to each other, to assist in establishing real world communications between the parties.

A further objective is to provide a social networking system that facilitates an initial introduction between two people.

A further objective is to provide a social networking system that provides documentation of their meeting, thereby enhancing the safety and security of the users.

A further objective is to provide a social networking system that facilitates later follow up conversations between two parties who have connected via the system.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

FIG. 4 is a screen capture of a second map screen generated by the social networking system of FIG. 1, illustrating the user near potential chat partners who are on different floors of a building.

FIG. 5 is a screen capture of a customization screen generated by the social networking system of FIG. 1, illustrating the user customizing his or her map settings to filter for potential chat partners based upon gender and distance.

DETAILED DESCRIPTION OF THE INVENTION

Figure 1:
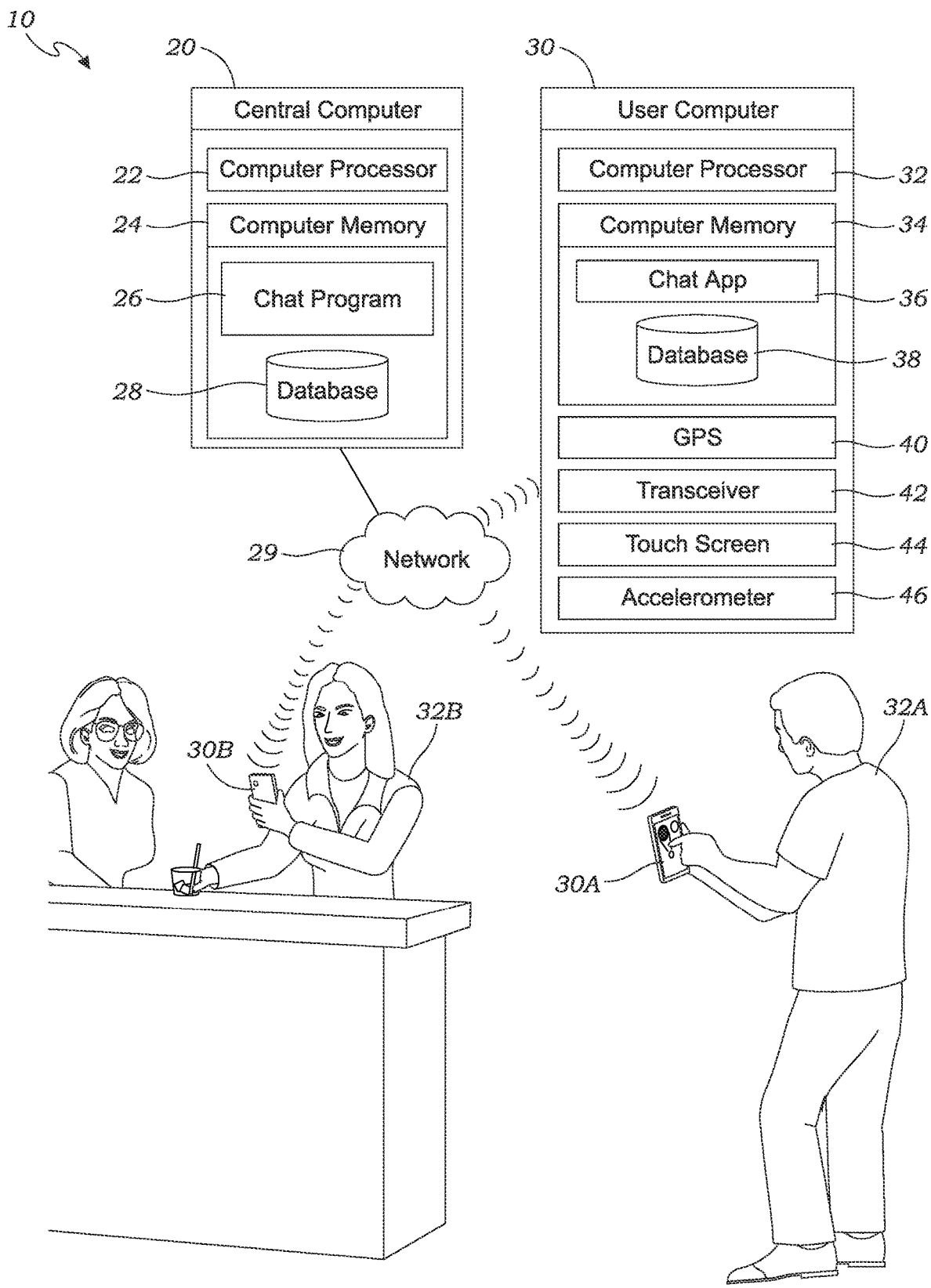
FIG. 1 is a block diagram of one embodiment of a social networking system that embodies the present invention.

The above-described drawing figures illustrate the invention, a social networking system for enabling a user to find other users with whom to communicate when the users are physically proximate to each other, to assist in establishing real world communications between the parties. Each user is able to physically indicate, through movement of a computer device such as a smartphone, another user who is of interest, and then view that user's profile, and potentially send a chat request.

For purposes of this application, the terms "computer," "computer device," "server," "smartphone," and similar terms, refer to a device and/or system of devices that include at least one computer processor, and some form of computer memory having a capability to store data. The computer may comprise hardware, software, and firmware for receiving, storing, and/or processing data as described below. For example, a computer may comprise any of a wide range of digital electronic devices, including, but not limited to, a server, a desktop computer, a laptop, a smart phone, a tablet, or any form of electronic device capable of functioning as described herein.

The term "computer processor" as used herein refers to an electrical component that performs operations on an external data source, such as a computer memory, typically in the form of a microprocessor, although any equivalent structure may be used.

The term "computer memory" as used herein refers to any tangible, non-transitory storage that participates in providing instructions to a processor for execution. Such a medium may take many forms, including but not limited to, non-volatile media, volatile media, and any equivalent media known in the art. Non-volatile media includes, for example, ROM, magnetic media, and optical storage media. Volatile media includes, for example, DRAM, which typically serves as main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge, or any other medium from which a computer can read. While several examples are provided above, these examples are not meant to be limiting, but illustrative of several common examples, and any similar or equivalent devices or systems may be used that are known to those skilled in the art.

The term "database" as used herein, refers to any form of one or more (or combination of) relational databases, object-oriented databases, hierarchical databases, network databases, non-relational (e.g. NoSQL) databases, document store databases, in-memory databases, programs, tables, files, lists, or any form of programming structure or structures that function to store data as described herein.

The term "user" as used herein, refers to any individual, or computer functioning on behalf of the individual, that is utilizing the system.

For purposes of this application, the reference to "tracking a location" is defined to mean that while generally most if not all users are tracked, this can also include not tracking some users who are not using the system, and/or who wish to remain invisible for a period of time. It is not necessary that all users be tracked at all times.

FIG. 1 is a block diagram of one embodiment of a social networking system 10 that embodies the present invention. In the embodiment of FIG. 1, the system 10 utilizes a central computer 20 that includes a computer processor 22 and a computer memory 24 that stores executable code that, when executed, enables the computer system to perform the processes described in greater detail below. In this embodiment, the computer memory 24 includes a chat program 26 and a database 28 whose functions are discussed in greater detail below.

The central computer 20 includes a network device for operably connection with a network 29, as discussed in greater detail below. The network device may be any form of communications hardware or software known in the art for enabling communications via a network. The network 29 may include any device or system for communicating information from one computer device to another. For example, a global computer network (e.g., the Internet) may be used, including any form of local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one to another. In addition, communication links within LANs typically include twisted wire pair or coaxial cable, while communication links between networks may utilize analog telephone lines, full or fractional dedicated digital lines, Digital Subscriber Lines (DSLs), wireless links including satellite links, or other communications links known to those skilled in the art. The network may further include any form of wireless network, including cellular systems, WLAN, Wireless Router (WR) mesh, or the like. Access technologies such as 3G, 4G, 5G, and future access networks may enable wide area coverage for mobile devices. In essence, the wireless network may include any wireless communication mechanism known in the art by which information may travel between computers of the present system.

As shown in FIG. 1, the system 10 is used in conjunction with user computers 30, typically in the form of portable personal computer devices such as smartphones. Each user computer 30 includes a computer processor 32 and a computer memory 34 that stores executable code that, when executed, enables the user computer 30 to perform the processes described in greater detail below. In this embodiment, the computer memory 34 includes a chat app 36 and a database 38 whose functions are discussed in greater detail below. These may be downloaded from app stores (e.g., Apple App store) or equivalent systems using methods known in the art.

The user computers 30 each have a GPS 40 (system for determining location using global positioning system satellites) for determining the location of the user, a transceiver 42 for communicating with the network 29, and a touch screen 44 or other mechanism for operably controlling operation of the computer 30. The computer 30 may include an accelerometer 46 for determining the movement of an the orientation of the user computer 30, for use in controlling the operation of the system 10, as discussed in more detail below.

As shown in FIG. 1, the social networking system 10 enables one of the users, which we will refer to as the "current user" 32A (i.e., the user currently using the system 10 to initiate a chat), to find and reach out to another user, which we will refer to as the "target user" 32B (i.e., the user that the current user is attempting to contact via chat using the system 10). The current user 32A is shown using user computer 30A, and the target user 32B is shown using user computer 30B. While we will often refer to user's performing certain actions, and being in certain locations, this is understood to often refer to the user computer being used, and these terms are often used interchangeably.

In FIG. 1, the current user 32A is illustrated pointing or "aiming" his or her user computer 30A at the target user 32B (or, technically, her computer 30B). As discussed below, this action triggers the system 10 to show a profile of the target user 32B, as discussed in more detail below, and enables the current user 32A to attempt to initiate a chat. FIGS. 2-8 provide screen captures which illustrate the operation of system 10 in more detail.

Figure 2:
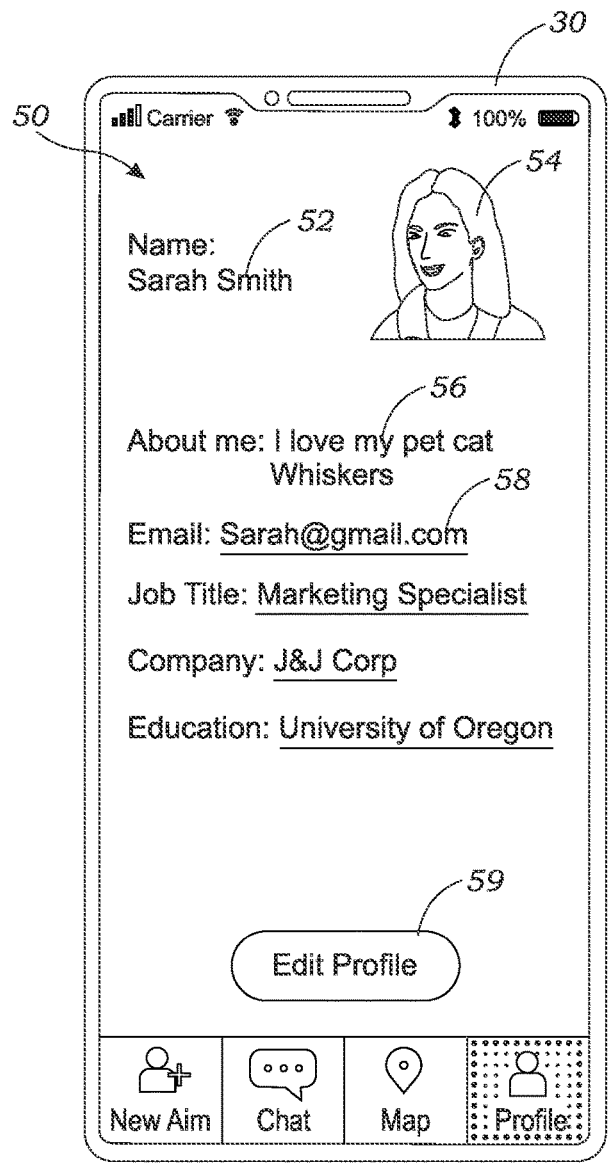
FIG. 2 is a screen capture of a profile screen generated by the social networking system of FIG. 1.

FIG. 2 is a screen capture of a profile screen 50 generated by the social networking system 10 of FIG. 1. As shown in FIG. 2, the profile screen 50 enables each of the users to enter information about themselves, such as their name 52, a photo 54, information about themselves 56 (e.g., hobbies and interests, personality traits, goals, and any other information deemed appropriate), contact information 58, and any other information desired or required. This information may be entered, edited, and updated via an edit feature 59 using systems and methods known in the art. The information may be maintained in the database 38 of the user computer 30 which may periodically update the database 28 of the central computer 20 (shown in FIG. 1), although in other embodiments a P2P system may be used where no centralized computer is used. Any systems which may be devised using skills known in the art should be considered within the scope of the present invention.

Figure 3:
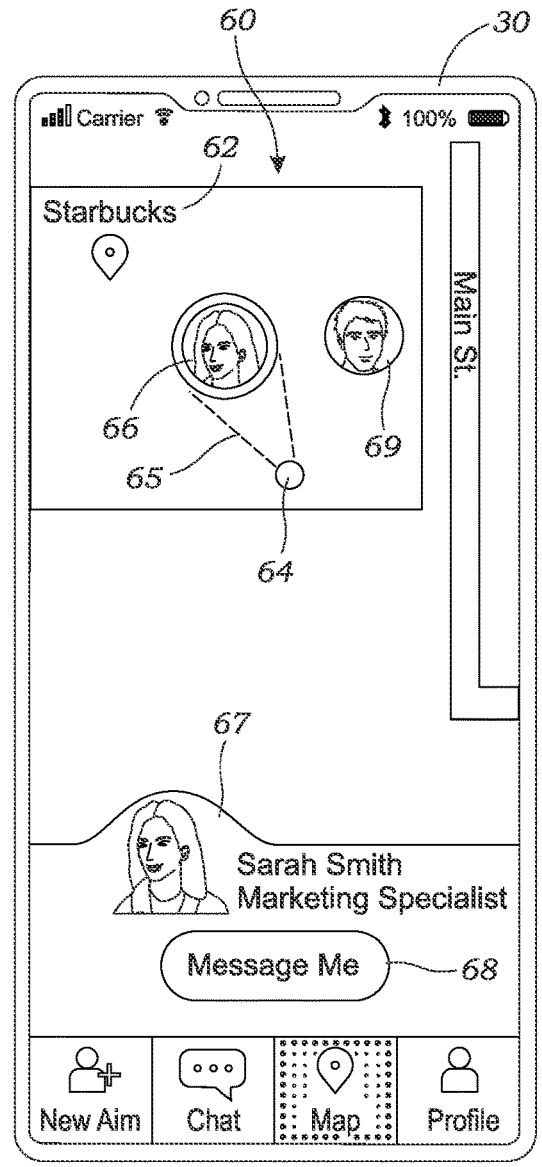
FIG. 3 is a screen capture of a first map screen generated by the social networking system of FIG. 1, illustrating a current user aiming his or her attention to a target user who is a potential chat partner.

FIG. 3 is a screen capture of a first map screen 60 generated by the social networking system 10 of FIG. 1, illustrating a current user 64 aiming his or her attention to a target user 66 with whom he or she might want to chat. In this embodiment, the map screen 60 may include buildings 62 (in this case, a Starbucks) in which the current user 64 (depicted as symbol 64) is physically located (as determined by the GPS 40 of the user computer 30, shown in FIG. 1). An indication of the direction of vision 65 of the current user 65 is illustrated on the map, showing the direction that the user 64 is oriented. While a shaded cone or beam is shown in the current embodiment, any equivalent imagery may be used, and should be considered within the scope of the present invention.

As shown in FIG. 3, the current user 65 is directing their indication of the direction of vision 65 towards the target user 66, which is represented by a symbol, in this case a photograph of the user (drawn from the database, from the user profile). When the target user 66 is within the indication of the direction of vision 65 (achieved via the movement of the smartphone), or is otherwise selected, a target user display 67 may be displayed, providing at least some information about the target user 66 from the profile of that user, in this case a photo, name, and brief information of the user. Selecting this display 67 may, in some embodiments, display the full profile of this user. A message button 68 may be provided so that the user may send an invitation to start a chat, as discussed in greater detail below.

Also shown in FIG. 3, other users 69 may also appear on the map, although they may not typically be highlighted until the user directs his or her indication of the direction of vision 65 towards them, or otherwise selects them. Other options for this display are discussed in greater detail below.

FIG. 4 is a screen capture of a second map screen 70 generated by the social networking system 10 of FIG. 1, illustrating the user 64 near potential chat partners who are on different floors of a building 71. The chat program 26 (and/or the chat app 36), shown in FIG. 1, is able to determine differences in vertical location (Z-axis), as well as standard GPS coordinates (X-axis and Y-axis). In this embodiment, vertical location is determined using the GPS system, which is able to distinguish significant differences in elevation using the GPS satellites. In other embodiments, the accelerometer 46 (shown in FIG. 1) may be used to track changes in elevation based upon movements of the user. Alternatively, a barometer (not shown) may be used, or other systems and methods known in the art for determining location.

In the example shown in FIG. 4, a first potential target user 72 is located above the user 64, so the display includes an elevational difference symbol 74, in this case a staircase with an upward facing arrow (although other forms of symbols or indicators may be used, including but not limited to different symbols, colors, or any other visible indicators that may be devised by those skilled in the art). A second potential target user 78 includes an elevational difference symbol 78 that shows that the potential user is below the user 64.

FIG. 5 is a screen capture of a customization screen 80 generated by the social networking system 10 of FIG. 1, illustrating the user customizing his or her map settings to filter for potential chat partners based upon gender and distance. In this embodiment, the screen 80 includes male/female selection buttons 82 that enable the user to select the gender(s) with whom he or she is interested in chatting with, as well as a slider 84 for indicating the distance allowed between users. This enables a user to set suitable boundaries, such as within a certain building (or part of a building), a certain area, or even a part of a city (if particularly large parameters are used. Smaller parameters may be required for very densely populated areas, while large parameters may be better for sparsely populated smaller towns.

Figures 6, 7:
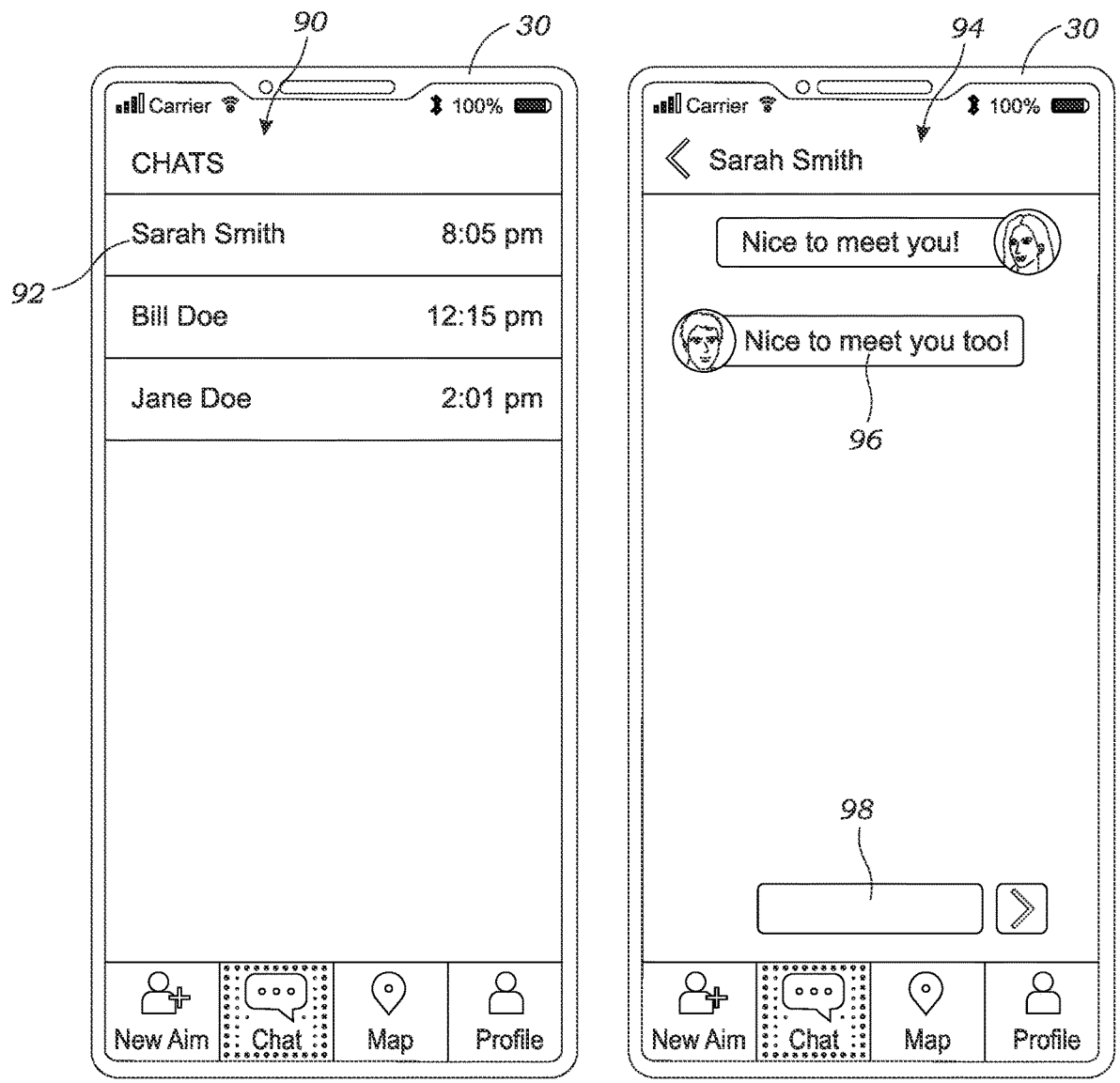
FIG. 6 is a screen capture of a first chat screen generated by the social networking system of FIG. 1, illustrating a list of chat partners that have previously connected with the user.
FIG. 7 is a screen capture of a second chat screen generated by the social networking system of FIG. 1, illustrating a chat that is currently taking place with one of the chat partners.

FIG. 6 is a screen capture of a first chat screen 90 generated by the social networking system 10 of FIG. 1, illustrating a list of chat partners 92 that have previously connected with the user. This screen 90 may be used to continue ongoing chats with people previously met. Selection of one of the chat partners 92 brings you to a chat conversion. FIG. 7 is a screen capture of a second chat screen 94 generated by the social networking system 10 of FIG. 1, illustrating one embodiment of a chat 96 that is currently taking place with one of the chat partners. A text box 98 typically located at the bottom (although it may be located anywhere desired) enables the user to enter further chat responses. Since the basic chat functionality is well known in the art, it is not described in greater detail herein.

Figure 8:
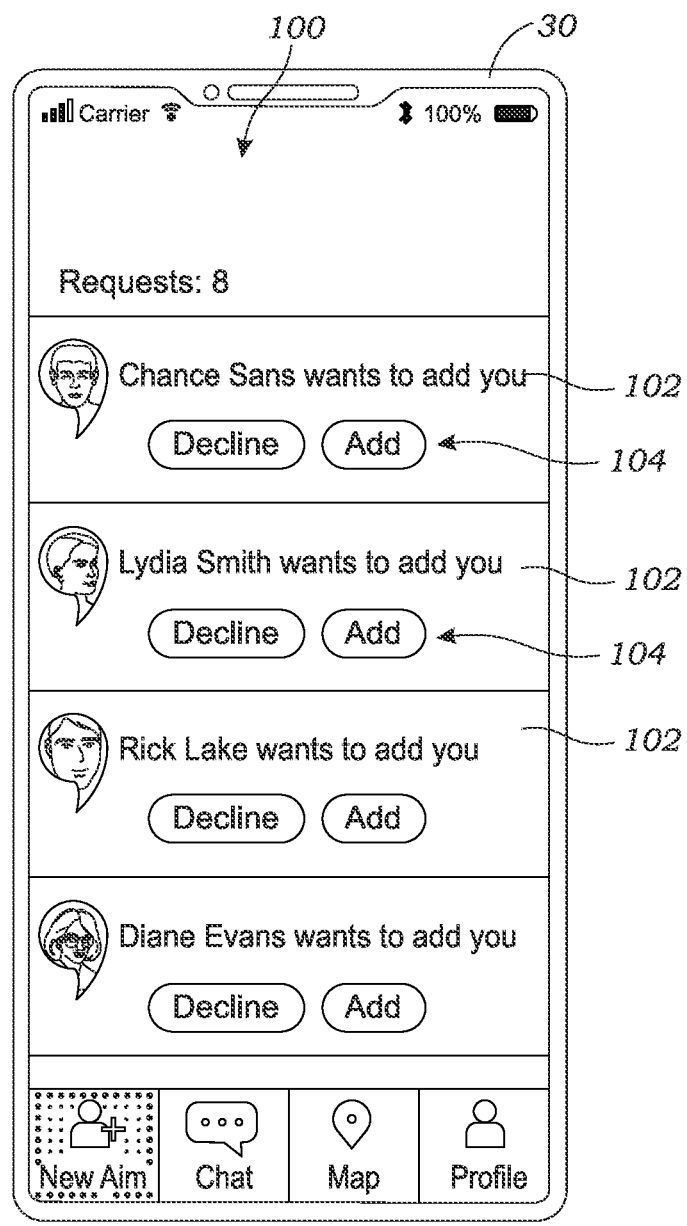
FIG. 8 is a screen capture of a proposed new chat screen generated by the social networking system of FIG. 1, illustrating a list of proposed new chat partners that are currently trying to connected with the user.

FIG. 8 is a screen capture of a proposed new chat screen 100 generated by the social networking system 10 of FIG. 1, illustrating a list of proposed new chat partners 102 that are currently trying to connected with the user. An accept/deny function 104 is provided to enable the user to either accept a proposed chat (moving them into screen 90 shown in FIG. 6), or deny the proposed chat, removing the offer from the list. Rejected chat proposals may potentially be archived but accessible from another archive screen (not shown), or they may simply be deleted. Rejected users may be notified of the rejection, or the proposed chat may simply be removed, according to the desire of the system designer.

In use, the social networking system receives profile information for each of a plurality of users. This may be performed via an editable version of the profile screen 50 shown in FIG. 2, or via other forms of data entry, and/or imported from other apps (other social networking sites, dating apps, etc.), or entered or received from any other source, using systems and methods known in the art. The profile information is stored in a database, on any of the databases discussed herein, or any other databases that might be designated by one skilled in the art.

A location of each of the plurality of users is then tracked, such as via the GPS 40 that is incorporated in the user computer 30, and the location of the current user 64 is displayed on the map 60, such as illustrated in FIG. 3. Other users, such as users 68 and 69, who are physically located proximate the current user 64, are also displayed on the map 60.

An indication of the direction of vision 65 of the current user is also displayed responsive to the physical movements of the computer device 30 of the user 64. The orientation and physical movements of the computer device 30 are used to orient the indication of direction of vision 65, using systems and methods that are generally known in the art for purposes of map navigation, such as used in Google® Maps. While a direction of vision is generally known for navigation purposes, it is not used to selecting another user for purposes of establishing a chat session.

In response to the current user 64 directing his or her direction of vision 65 at one of the other users, marking that user as the target user 66 and displaying the profile of the target user, in this case in the form of a target user display 67. The target user display 67 may include the photograph, name, and/or any other information deemed suitable by one skilled in the art. Upon selection of this target user, a chat request is sent from the current user to the target user, and the target user receives the chat request in a manner such as shown in FIG. 8. A response is then received from the target user regarding the chat request, and if the chat request is approved, opening a chat session (such as shown in FIG. 7) between the target user and the current user.

As discussed above, the current user and the target user are then about to chat with each other, and if agreeable, the two parties can physically meet and continued to talk in person, and then also continue their chat later once they have gone their separate ways. This not only facilitates the initial introduction, it also provides some level of documentation of their meeting, thereby enhancing the safety and security of the users, and it also facilitates later follow up conversations at later times.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A social networking system for facilitating social interaction between a plurality of users, the social networking system comprising:

one or more computer devices having a computer processor and computer memory, the computer memory storing executable code that, when executed by the computer processor, enables the computer system to perform a process that comprises:

receiving profile information for each of the plurality of users, the profile information including a name of the user, at least one photograph of the user, and personal information about the user's hobbies and interests;

storing the profile information in a database;

tracking a location of each of the plurality of users;

displaying on a map the location of a current user, and also displaying other users who are physically located proximate the current user;

displaying an indication of the direction of vision of the current user responsive to the physical movements of the computer device of the user;

in response to the current user directing his or her direction of vision at one of the other users, marking that user as a target user and displaying the profile of the target user, including the name of the user, the at least one photograph of the user, and the personal information about the user's hobbies and interests;

sending a chat request from the current user to the target user, the chat request including the profile information of the current user so that the target user can review the profile information of the current user who is making the chat request, to determine if he or she would like to start a chat, and further including an accept/deny function that enables the target user to accept or deny the chat request; and opening, in an event that the target user accepts the chat request with the current user, a chat session that includes a text box that enables two way text communication between the current user and the target user.

2. The social networking system of claim 1, further comprising the steps of: determining the elevation of each of the other users relative to the current user, and displaying an elevational difference symbol on the map adjacent to each of the other users.

3. The social networking system of claim 1, wherein the profile information of each user includes contact information for the corresponding user.

4. The social networking system of claim 1, further comprising the steps of providing a customization screen to each of the plurality of users that includes a filter for filtering potential chat partners, so that each of the corresponding user can restrict interactions with the other users based upon his or her personal preferences.

5. The social networking system of claim 4, wherein the customization screen includes a gender selection that enable the current user to select the gender(s) with whom they are interested in chatting, and any chat requests from non-selected genders are prohibited.

6. The social networking system of claim 4, wherein the customization screen enables selection of a distance permitted between the plurality of users, outside of which chat requests are not permitted.

* * * * *